US008660042B2

(12) United States Patent
Goldhamer

(10) Patent No.: US 8,660,042 B2
(45) Date of Patent: Feb. 25, 2014

(54) CONNECTING VARIOUS WIRELESS TERMINALS OVER POWER LINES

(76) Inventor: Mariana Goldhamer, Ramat Gan (IL)

( * ) Notice: Subject to any disclaimer, the term of this patent is extended or adjusted under 35 U.S.C. 154(b) by 36 days.

(21) Appl. No.: 13/487,461

(22) Filed: Jun. 4, 2012

(65) Prior Publication Data

US 2012/0307917 A1    Dec. 6, 2012

(30) Foreign Application Priority Data

Jun. 6, 2011  (IL) .......................................... 213396

(51) Int. Cl.
*H04B 1/44* (2006.01)
*H04B 3/36* (2006.01)
*H04L 5/14* (2006.01)
*H04B 7/14* (2006.01)
*H04L 12/28* (2006.01)
*H04J 3/26* (2006.01)
*H04J 3/16* (2006.01)
*H04J 1/00* (2006.01)
*H04J 3/10* (2006.01)

(52) U.S. Cl.
USPC ........... 370/282; 370/293; 370/294; 370/295; 370/315; 370/351; 370/432; 370/467; 370/480; 370/201; 370/252

(58) Field of Classification Search
USPC ......... 370/276, 277, 280, 281, 294, 295, 310, 370/351
See application file for complete search history.

(56) References Cited

U.S. PATENT DOCUMENTS

| 6,243,571 | B1 | 6/2001 | Bullock et al. |
| 7,269,403 | B1* | 9/2007 | Miao ............................. 455/402 |
| 7,804,763 | B2* | 9/2010 | Berkman et al. .............. 370/208 |
| 2007/0201540 | A1 | 8/2007 | Berkman |
| 2008/0273613 | A1 | 11/2008 | Kol |
| 2009/0298435 | A1* | 12/2009 | Lee et al. ...................... 455/63.1 |
| 2010/0215023 | A1* | 8/2010 | Hoole ........................... 370/332 |
| 2011/0044295 | A1* | 2/2011 | Li et al. ......................... 370/336 |

OTHER PUBLICATIONS

LTE overall description is in 3GPP TS36.300. 3GPP TS 36.300 "3rd Generation Partnership Project: Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", V10.3.0 (Mar. 2011).

(Continued)

*Primary Examiner* — Omar Ghowrwal

(57) ABSTRACT

A method of extending the coverage of a wireless communication network having two or more nodes communicating over power lines network is provided herein. The method includes: providing the nodes with respective adapters, each one of the adapters coupling its respective node with the power lines network and being further operable in at least one of: receiving mode, transmitting mode; selecting one or more time-division duplex frequency channel or two or more frequency-division duplex frequency channels for communication over the power line media, such that less interfered frequencies are used, to maintain or to yield an increase in wireless communication performance between the nodes; broadcasting over the power line, via at least one of the adaptors, signals or information indicative of a central frequency point for each one of the selected frequency channels; and establishing a communication link over the power lines network between the nodes via the adaptors.

20 Claims, 4 Drawing Sheets

(56) References Cited

OTHER PUBLICATIONS

The most important 3GPP LTE PHY standard is 3GPP 36.211, "3rd Generation Partnership Project; Technical Specification Group Radio Access Network; Evolved Universal Terrestrial Radio Access (E-UTRA); Physical Channels and Modulation". 3GPP TS 36.211 V10.1.0 (Mar. 2011) is included.
IEEE 802.11, "Part 11: Wireless LAN Medium Access Control (MAC) and Physical Layer (PHY) Specifications", Jun. 2007 (pp. i-xxxxv). 802.11 OFDM PHY is included in Section 17.
IEEE 802.16-2009, Part 16: Air Interface for Broadband Wireless Access Systems, May 2009 (pp. i-xxxxv).
FCC 10-174, "Second Memorandum Opinion and Order", Sep. 2010.
Document 5D/542-E, Oct. 2, 2009, IEEE, Submission of a Candidate IMT-Advanced RIT Based on IEEE 802.16, (Part 3 of 4).
3GPP TR 36.912 V10.0.0 (Mar. 2011), 3rd Generation Partnership Project; Technical Specification Group Radio Access Network; Feasibility study for Futher Advancements for E-UTRA (LTE-Advanced) (Release 10).
Recommendation ITU-R M. 1457-10, "Detailed specifications of the terrestrial radio interfaces of International Mobile Telecommunications-2000 (IMT-2000)", Jun. 2011. The following standards are described: CDMA/UTRA (FDD): Sections 5.1.1.3, 5.1.1.4. 5.1.1.6, 5.1.2.1, 5,1.2.2 CDMA/UTRA (TDD): Sections 5.3.1.3, 5.3.1.4, 5.3. 2.1, 5.3.2.2 : HSDPA is a feature of UTRA EV-DO is described in Sections 5.2.1.1.2.1.2 and 5.2.1.1.2.2.2.
LTE overall description is in 3GPP TS36.300. Are included the most relevant sections from 3GPP TS 36.300 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", V10.4.0 (Dec. 2011).
RRH (Remote Radio Heads): a deployment scenario is in Annex J of 3GPP TS 36.300, p. 59 of the included file. The technology which uses RRH is named CoMP (Cooperative MultiPoint). A description is included in 3GPP TR 36.814 V9.0.0 (Mar. 2010), "3rd Generation Partnership Project; Technical Specification Group Radio Access Network; Evolved Universal Terrestrial Radio Access (E-UTRA); Futher advancements for E-UTRA physical layer aspects", Section 8, p. 15-19.
The most important 3GPP LTE PHY standard is 3GPP 36.211, "3rd Generation Partnership Project; Technical Specification Group Radio Access Network; Evolved Universal Terrestrial Radio Access (E-UTRA); Physical Channels and Modulation". 3GPP TS 36 211 V10.4.0 (Dec. 2011) is included.
IEE 802.11, "Part 11: Wireless LAN Medium Access Control (MAC) and Physical Layer (PHY) Specifications", Mar. 2012 (pp. i-lxvi). 802.11 OFDM PHY is included in Sections 18 and 20 of this document of 2800 pages.

IEEE 802.16 (known as WIMAX) is included in IEEE 802.16-2012, IEEE Standard for Air Interface for Broadband Wireless Access Systems, Aug. 2012. (pp. i-xcix, 1-8) of more than 2500 pages.
IEEE 802.15.4 Part 15,4: Wireless Medium Access Control (MAC) and Physical Layer (PHY) Specifications for Low-Rate Wireless Personal Area Networks (LR-WPANs), Oct. 2003. It is not possible to extract fragments.
TV White Spaces are regulated in the document FCC 12-36, "Third Memorandum Opinion and Order", Apr. 2012.
Power line regulations are included in FCC CFR-2009-title47-vol1-part15, 2009, in Subpart C: Intentional radiators and Subpart G—Access Broadband Over Power Line (Access BPL), sections 15.601-15.615.
Deliverable D3.2 of the FP7 ICT project Omega (pp. 1-14, 25-52), Feb. 2011.
World Health Organization, "Electromagnetic fields and public health: mobile phones", Fact sheet N°196 Jun. 2011, p. 1.
Recommendation ITU-R M.2012 Detailed specifications of the terrestrial radio interfaces of International Mobile (IMT-Advanced) provides the basic characteristics of LTE-Advances (Annex 1) and WirelessMAN-Advanced (Annex 2) (Jan. 2012).
Recommendation ITU-R M. 1457-10, "Detailed specification of the terrestrial radio interfaces of International Mobile Telecommunications-2000 (IMT-2000)". Jun. 2011. A short description of most important features in 802.16 is included in Section 5.6, which may be useful for the general understanding.
3GPP TS 36.423 V10.1.0 (Mar. 2011), "3rd Generation Partnership Project; Technical Specification Group Radio Access Network; Evolved Universal Terrestrial Radio Access Network (E-UTRAN); X2 application protocol (X2AP)", pp. 1-75.
CQI is defined in Section 7.2.3 of 3GPP 36.213 V10.1.0 (Mar. 2011), 3rd Generation Partnership Project; Technical Specification Group Radio Access Network; Evolved Universal Terrestrial Radio Access (E-UTRA); Physical layer procedures (pp. 1-8,61-68).
RSRP and RSRQ are defined in sections 5.1.1 and 5.1.3 of 3GPP 36.214 V10.1.0 (Mar. 2011). 3rd Generation Partnership Project, Technical Specification Group Radio Access Network; Evolved Universal Terrestrial Radio Access (E-UTRA); Physical layer; Measurements.
Shmuel Goldfisher, MainNet. Communication, Shinji Tanabe, Mitsubishi Electric Corporation, "IEEE 1901 Access System: An Overview of its Uniqueness and Motivation", IEEE Communications Magazine < Oct. 2010.
ITU-T G 9960 Series G: Transmission Systems and Media, Digital Systems and Networks, Access networks—In premises networks Unified high-speed wireline-based home networking transceivers—System architecture and physical layer specification (Dec. 2011).
Md. Mustafizur Rahman, Choong Seon Hong, and Sungwon Lee, Kyung Hee University, Jaejo Lee, Korea Electrotechnology Research Institute, Md. Abdur Razzaque and Jin Hyuk Kim, Kyung Hee University, "Review of IEEE 1901and G.hn standards", IEEE Communications Magazine < Jun. 2011.

* cited by examiner

CONNECTING VARIOUS WIRELESS TERMINALS OVER POWER LINES

CROSS REFERENCE TO RELATED APPLICATIONS

This application claims priority from Israeli patent application No. 213,396 titled "Connection of different terminals through power lines" filed on Jun. 6, 2011, which is incorporated herein by reference in its entirety.

BACKGROUND

1. Technical Field

The present invention relates generally to digital communication and more specifically to communications over power lines.

2. Discussion of the Related Art

In the last years the broadband wireless mobility and the machine-to-machine communications were considered as markets to enable an important economic growth. The wireless and M2M (machine-to-machine) services, including the Smart Grids communication, require ubiquitous deployment for satisfying the user requirements for these services.

While the power line is a natural media for ubiquitous coverage for fixed M2M and Smart Grid applications, the wireless coverage is limited by obstacles and the wall penetration. The PLC (Power Line Communication) is used for data communication on already significant distances, targeting to compete with other broadband access technologies, as ADSL, Cable modem, Fixed and Mobile Cellular. PLC is also the natural form for connecting the in-house Smart Grids or for being used in other M2M (Machine-to-Machine) applications, due to the ubiquitous presence of the AC power supply.

The 3G-4G cellular technologies enjoy the broadband and mobility properties, but they have the problem of outdoor-to-indoor penetration, especially into those isolated places where the Smart Grid sensors and meters are placed. In addition, the broadband cellular technologies, as LTE, have a serious problem in supporting a very high number of machine-type terminals (MT) in their cell coverage area.

While U.S. Pat. Nos. 6,243,571 or 7,269,403 describe the possibility of transmitting the wireless signals over the power line, they do not take into account that also the power line is a media with lots of interferences and there is need of a method to asses and avoid such interferences. US patent application 20070201540, considering hybrid power line and wireless media, discuss the interference and channel selection only for the wireless media.

MIMO operation in wireless cellular networks has been expanded in the last years to 8 antenna ports. However the US application 20080273613 is limited to only two antenna ports, because is using the existing phase, neutral and ground power lines.

The wireless technologies deployed in license-exempt bands have a limited coverage, due to the limitation of the transmitted radio power. In the last time, the digitally connected Remote Radio Head (RRH) technology, allowing to connect by optical fibers the remote radios, has received a special attention in 3GPP, due to the potential benefits of both coverage and increased data rates. However the optical fiber is not available in any place and the requested data rates around of 1 Gb/s per base station may be highly priced.

Another aspect to be considered is the potential negative impact of the mobile phones on the humans health, confirmed by an OMS (World Health Organization) study just published.

BRIEF SUMMARY

It is an object of the present invention to provide a cost-effective method for enhancing the wireless coverage and for combining the wireless and M2M/Smart Grid communications.

It is another object of the present invention to provide a method for the selection of the frequency channel to be used over the power line segment. It is still another object of the present invention to provide a method for transporting the MIMO signals generated by the wireless technology over the power line. It is still another object of the present invention to provide a simple method for enabling spatial diversity for the efficient operation of the MIMO-enabled wireless terminals, while using a single pair of power line conductors. Other objects of the invention will become visible as the detailed description will progress.

According to a first embodiment of the present invention there is provided a method of extending the coverage of a wireless communication network having two or more nodes at least partially communicating over power lines network, the method may include the following stages: providing the nodes with respective adapters, each one of the adapters coupling its respective node with the power lines network and being further operable in at least one of: receiving mode, transmitting mode; selecting (i) one or more time-division duplex (TDD) frequency channel or (ii) two or more frequency-division duplex (FDD) frequency channels for communication over the power line media, such that less interfered frequencies are used, to maintain or to yield an increase in wireless communication performance between the nodes; broadcasting over the power line, via at least one adaptor, signals or information indicative of a central frequency point for each one of the selected frequency channels; and establishing a communication link over the power lines network between the two or more nodes using the selected TDD frequency channel or FDD frequency channels and the adaptors of the respective nodes.

Preferably, each of the nodes is a base station, a remote radio head, a relay as defined in this invention, a terminal operational according to a power line technology and a general wireless terminal, while the wireless technology is a cellular technology or an IEEE 802.11 technology or an IEEE 802.15 technology.

According to still another embodiment, at least one said adapter may be operational to adapt between the power line communication technology and the wireless technology used for communications over the power line media.

Preferably, the frequency channel selection for communications over the power line media is based on the selection of the frequency channel from a provisioned list and/or on the measurements of the receive power and/or of the receive power density and/or of the interference levels and/or background noise and/or packets lost and/or packets discarded and/or link capacity and/or on the achievable modulation and coding state (CQI) and/or RSRP and/or RSRQ.

Based on a possible embodiment, the assessment of the interference levels provides the achievable modulation and coding state and/or RSRP and/or RSRQ and/or the percentage of discarded packets as reported by a wireless terminal incorporated in an adaptor and/or by a base station.

In still another embodiment, the wireless technology implemented for the assessment of the interference impact and/or for transmitting the signals or information of the said frequency channel selection is different from the wireless technology used for wireless communications over the air media.

In an embodiment relevant to FDD wireless systems, the duplex separation between the said two frequency channels used over the power line media is different from the duplex separation between the two FDD frequency channels used over the air media.

In concordance with yet another preferred embodiment, the wireless MIMO operation is adapted to the power line by allocating a dedicated frequency channel to each MIMO port transmission.

In an embodiment which preserves the wireless system MIMO operation, at least two different adapters form a spatial MIMO system operational to communicate with a general wireless terminal.

In an embodiment relevant to the use of this system by a cellular operator, at least one frequency channel used over the power line is part of the licensed frequencies allocated to the cellular operator.

In an embodiment relevant to the use of this system with higher levels of "out-of-band" emissions, at least one frequency channel used over the power line is part of the license-exempt frequencies allocated to wireless operation.

According to another embodiment, it is provided an adapter operational for expanding the coverage of a wireless communication network having two or more nodes at least partially communicating over power lines, the adaptor being operational to:
 couple its respective node with the power lines network and further operate in at least one of: receiving mode, transmitting mode;
 select (i) one or more time-division duplex (TDD) frequency channel or (ii) two or more frequency-division duplex (FDD) frequency channels for communication over the power line media, such that less interfered frequencies are used, to maintain or to yield an increase in wireless communication performance between the nodes;
 broadcast over the communication network, via one of the nodes signals or information indicative of a central frequency point for each one of the selected frequency channels; and
 establish a communication link over the power lines network between the two or more nodes using the selected TDD frequency channel or FDD frequency channels the adaptors of the respective nodes.

According to another embodiment, the adapter is further configured to adapt the signals transmitted or received at the wireless node MIMO ports to at least two different frequencies for being transmitted over the power line media.

According to still another embodiment, the adapter includes a processor operational to implement MIMO communications from two said adapters towards a general wireless terminal.

According to another embodiment, the adapter may be operational to assess the impact of interferences created by communications over power line, incorporating the lower layers of a general wireless terminal which was configured to measure and report the results of such measurements.

17. Based on another embodiment, the general wireless terminal complies with the 3GPP LTE or IEEE 802.16 technologies.

Based on an embodiment pertinent to M2M communications, the adapter incorporates a processor able to act as concentrator of the information provided by at least two machine-type terminals using wireless or power line technologies.

Based on another embodiment, the adaptors can incorporate the relevant messages and the communication support of the X2 interface used in LTE systems and/or relevant messages and the communication support for interaction with the operation and management system managing the operation of the wireless nodes.

According to still another embodiment is provided a management and/or control system, adapted to use the information provided by an adapter and/or by a general wireless terminal for selecting the optimal frequency channels for operation over the power line.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements.

In the accompanying drawings.

DETAILED DESCRIPTION

Figure 1:
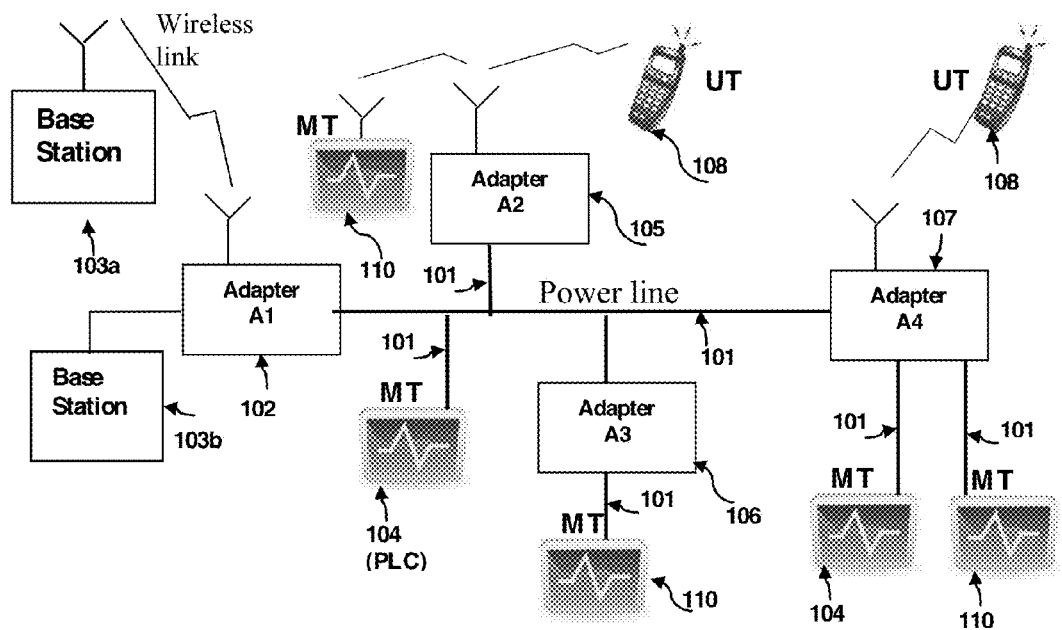
FIG. 1—Represents the general network configuration of the invented system, indicating the connection of a first adaptor to the wireless base station and the adapters allowing connectivity with user and machine-type terminals operating over the air or over the power line media.

In the following description it is used a terminology familiar to those skilled in wireless networks and in particular in LTE and WiMAX technologies. This should not be considered as a limitation for the general applicability of the invention. Some terms which need clarification for the context of this invention are presented below.

Technologies

The term "technology" indicates in this invention the main characteristics and parameters of the physical layer (PHY), the Media Access Control (MAC) and the central node-to-terminal messaging (RLC—Radio Link Control) implemented in devices for communicating over a given media and defined by a standard or by a proprietary specification. Two basic technologies are referred to herein: wireless technologies and PLC technologies.

Standardized wireless technologies can be, for example, CDMA and the derived families like CDMA/EV-DO developed by 3GPP2, GSM, HSPA, HSDPA, LTE, etc. developed by 3GPP, Wi-Fi (802.11), ZigBee (802.15.4), 802.16 (WiMAX) developed by IEEE. The standardized wireless technologies today are in general produced by 3GPP, 3GPP2, ATIS, ETSI, IEEE 802.11, 802.15, 802.16, 802.20 and 802.22.

Cellular technologies are a sub-set of wireless technologies, being designed for large area operation. The cellular technologies are standardized by forums like 3GPP, 3GPP2, IEEE 802/WiMAX, ETSI TETRA, etc. Some of the cellular technologies are recognized by ITU-R as IMT-2000 or IMT-Advanced technologies.

PLC technologies may be proprietary or those produced by the HomePlug Powerline Alliance, IEEE 1901.1 (broadband), IEEE 1901.2 (narrowband), ITU G.9960 (for home networks), etc. These technologies were designed specifically for communications over power line in frequencies below 100 MHz.

A special case considered in this invention is the use of a wireless technology over the power line. In fact, some of the power line technologies use physical layer modulations, as OFDM, also included in some cellular standards (802.16, LTE). The OFDM modulation is resilient to multi-path, which appears in wireless networks due to reflections caused for example by hills, high-rise obstacles and on the power-line networks due to the tree-like deployment and impedance mis-matches.

Terminals

For simplification, we address in continuation only two types of terminals, from the general much larger family of general wireless terminals:

1. User Terminals (UT), including the PHY, MAC and RLC components of the wireless technology, providing connectivity for wireless fixed or mobile services, like voice, data, video, games, etc. Example of devices incorporating UTs are mobile phones, smart phones, Laptops, modems to provide fix wireless services, etc. The UTs use only wireless technologies for connectivity. The UT's PHY and MAC functionality is also used in Layer 2 and Layer 3 Relays and also in I-Relays to be defined in continuation.

2. Machine-type terminals (MT), include the PHY,MAC and RLC components of the wireless or PLC technologies for connecting sensors and meters used for electricity, gas, water. MTs typically transmit narrow-band information and may receive controls, such as remote air-conditioner or owen control. MTs may have reduced functionality when compared with UTs.

MTs may be also connected to video cameras used for surveillance. The video camera may transmit broadband data (video streaming, pictures, etc.) and receive controls through the associated MT, for moving the camera in different directions. Herein this invention, the MT may communicate directly over the power line, while implementing a wireless technology, but instead of being connected to an antenna is connected to a power line.

The fact that we address hereinafter only these two types of terminals shall not be interpreted such that other wireless terminals are not under the scope of this invention. We use herein the term "general wireless terminal" to designate any type of wireless terminal.

Connectivity and System Architecture

The invention is described hereinafter in conjunction with the figures. The scope of the invention is to create a reliable communication path between the UTs and MTs placed outside of the wireless base station (BS) coverage or an optimum capacity area. We use the term base station in relation with any wireless communication device, deployed in licensed or license-exempt spectrum, which is transmitting wireless traffic towards the wireless terminals. The alternative terminology may be Base Station Transceiver, Access Point, PAN Coordinator, etc.

The hereinafter exemplification of the invention is describing, for simplification, only centralized or point-to-multipoint wireless systems, however this should not be understood as preventing the invention to be applied to mesh or multipoint to multipoint wireless systems.

FIG. 1 exemplifies a network configuration for carrying out the method provided by the present invention. In this invention the power line 101 is the media for connecting a number of adapters having the role to extend the coverage of the wireless system. The main element of the network configuration is the adapter A1-102, which is connected on one side to a main wireless base station—103a or 103b. The connection to the BS can be made over the air, as illustrated for the BS 103a, or using wires, as shown for the BS 103b. The wires may be connected to the antenna ports of the BS or to baseband signals or their digital equivalent, which may be a multiplexed form of such signals. A remote connection to the BS, similar with the mode in which a RRH (Remote Radio Head) is connected, shall be also considered a BS in the context of this invention.

On its other side, the adapter A1-102 is connected to the power line 101. The adapter A1-102 includes, but is not limited to, an optional wireless relay for communicating with a remote BS like 103a, a frequency adapter block (FAB) and a power line interface (PLI).

The entire system, the FAB and eventually the PLI are managed by a control function (BSCF). The BSCF communicates with the ACF (Adapter control function) located in other adapters, through a communication protocol. The BSCF can be located in A1-102 or in a main Base Station-103 or in the Control and Management network nodes.

In case that the Adapter A1-102 is linked to a main BS-103b as a Remote Radio Head, through a cable optic or other type of connection, the presence of the actual radio sub-system is not necessary for our system.

The adapter A2-105 may connect between the power line on one side and the wireless media on the other side, acting on its wireless side as a small base station or as a repeater, for connecting the wireless UTs and/or MTs in its coverage area. A different adapter can be used for each wireless technology or multiple technologies and radios transmitting on the suitable frequencies may be grouped in the same adapter.

The adapters A3-106 and A4-107 can connect MT-104 over the power line medium. Such MT connection is represented in the figures by using different adapter ports, however in a practical implementation all the connections may be multiplexed in frequency over the same port.

The adapters A3-106 are connected over the power line to the adapter A1-102 and also to MT-104, using PLC technology. Because the connection to MT-104 uses PLC technologies, the adapter A3-106 converts between the PLC and wireless technologies, such that the data from/to MT-104 is transmitted to/from BS.

Sometimes, given the small area of the intended deployment, a single adapter A3-106 may suffice. In this case, it may be placed in the vicinity of A1-102 and may be connected over the power line or through an Ethernet or optical cable. The adapters A4-107, also connected to adapter A1 over power line, may be used to provide connectivity to MT-104, MT-110 and UT-108. The adapter A4-107 may include different wireless technologies, as a cellular technology and Zigbee (IEEE 802.15.4) or a wireless technology and a PLC technology and may operate simultaneously on different radio frequencies. A4-107 shall convert all the technologies to the wireless technology used by the BS or by the adapter A1-102.

As can be observed from FIG. 1, the power line-101 represents an always present segment in the operation of the system. Each adapter A2-102, A3-106, A4-107 should include an Adapter Control Function, a Frequency Adapter and a Line Interface, including an amplifier, for the operation over the power line. In some embodiments, the adapters may behave as a concentrator for the MTs connected to it using wireless or PLC technologies. Alternatively, the concentrator function may be performed by A1-102 for the entire system. The concentrator has the role of concatenating or grouping a multitude of small information packets originating from a multitude of MTs. From deployment p.o.v., the adapters A2-105, A3-106, A4-107 behave as remote radio heads, providing radio coverage at spatially distributed locations. There may be many instances of the adapters A1-102, A2-105, A3-106 and A4-107, even if they are not represented in FIG. 1.

Relays

The adapters operate as relays, which can be defined at Layer 1, Layer 2 or Layer 3. In this invention a Layer 1 relay amplifies the radio signal, without decoding it, and retransmits the signal on the same or on a different frequency. Same channel width is typically used on the both sides of the relay.

In this invention a Layer 2 relay decodes as a UT/MT and encodes as a BS the radio signal at a different time and/or a different frequency. It may use different frequency channels and/or different channel widths on the relay sides. It may use local scheduling or scheduling done by the BS or another node (as Radio Network Controller in UMTS networks).

In this invention a Layer 3 relay includes two distinct nodes, the UT/MT (only low layers functions) and the relay's BS. The repeater's UT/MT is connected to the main BS by wireless or by power line media, and to the relay's BS by a wired connection. The regular MT/UTs are connected to the Relay's BS by radio or by power line media. Also this Relay decodes and forwards the radio signal at a different time and may use different frequency channels and/or different channel widths on the adapter sides. The relay self-backhauling can be done in-band (same frequency channel is used on its both sides) or out-of-band.

In FIG. 1, the adapters A2-105, A3-106 and A4-107 are relays; the adapter A1-102 is also a relay, if its backhaul is provided by a wireless BS 103a. The Layer 3 relay is an interesting node, because the wired connection can use a PLC protocol instead of Ethernet.

Figure 2:
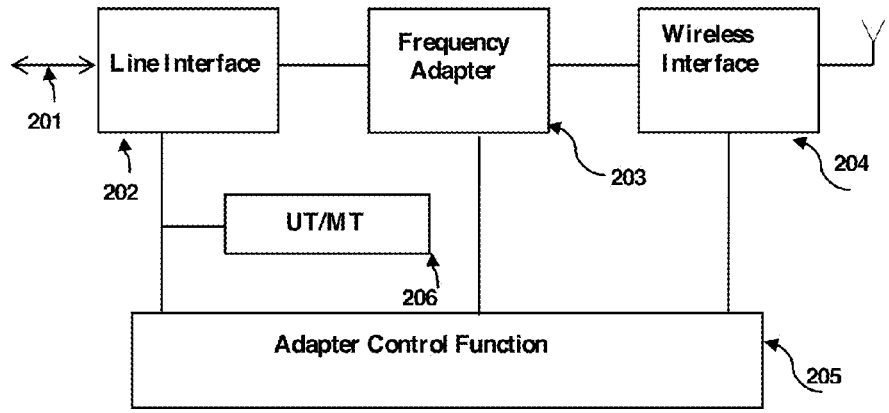
FIG. 2—Represents the internal blocks of a cost-effective relay node suitable to this invention.

The I-Relay is a novel node defined in this invention (see FIG. 2), as a cost-effective node for the proposed system. The I-Relay is essentially a Layer 1 relay which may use a UT/MT-206 (only the lower layers) for measuring and reporting the receive power levels, their statistics and the background noise (interference) levels and statistics. In a cost-effective implementation, the report of the measurement results may be communicated by the processor embedded into the wireless UT/MT directly to the adapter control function, such that the radio of the used UT/MT will not be necessary. Alternatively the I-Relay may use a dedicated module for performing the above functions. The I-Relay includes towards the power line 201 a line interface-202, including amplifier functions and frequency adapter block-203. It may include a frequency adapter block also on its wireless interface 204. All the frequency adapters 203 (FA) and eventually the interfaces are controlled by an adapter control function (ACF)-205.

We do not describe in this invention how a frequency adapter works, because changing a frequency to another frequency is well known in the radio industry.

For extending the coverage, the system may work as multi-hop relay, each of the adapters in FIG. 1: A2-105, A3-106, A4-107 having another relay chain behind them.

Multiplexing of Traffic Over Power Lines

The most convenient way of multiplexing the wireless and PLC traffic over the power line is in frequency domain. However the traffic can be also multiplexed in the time domain or in a combination of time and frequency resources.

The basic multiplexing modes over power line are:
a. Different frequencies for the wireless and PLC technologies
b. Same technology and frequency for the wireless and M2M traffic. The technology can preferably be a wireless technology. The data is multiplexed based on the resource allocation schemes for the specific technology. Such schemes could be TDM, TDMA, OFDMA, CDMA, SC-FDMA.
c. Multiplexing of two different technologies on the same frequency, based on time division between technologies; and
d. A combination of the two or more of the above methods.

Multiplexing in Frequency Domain

The preferred way of multiplexing the wireless and PLC traffic over the power line is the frequency multiplexing.

The genuine PLT technologies use the spectrum below 100 MHz, preferably below 30 MHz. The frequencies to be used on the power line in the system according to some embodiments of the present invention are discussed hereinafter:

A first solution is that the adapter A1 only amplifies the received radio signal that it receives. However, for a Layer 1 Relay, connected to the main BS on the frequency channel f1, it may be problematic to use the same frequency channel f1 after the adapter A1, some issues being:

The adapter A1 cannot receive and transmit in the same time on the same frequency, due to the interference injected by the transmitter into receiver;

The adapter A1 cannot receive, amplify and transmit in the same time, due to the oscillations which can take place.

Another solution can be the simple frequency translation of the cellular traffic, from the frequency channel f1 to another frequency channel f2, which may be located in the same frequency band (problematic) or in a different frequency band. Examples of frequency bands are 5 GHz, 2.4 GHz, 2.5 GHz, GSM bands, UTRA bands, each of them including a number of frequency channels.

Given the relatively short range of operation, the selected frequency channels may be at frequencies higher than the frequencies currently used by the PLC. However, also frequencies below 100 MHz can be used.

If the adapter A1 uses a cellular technology with FDD duplexing, in fact there will be two channels to be translated, i.e. one channel f1' for the transmit direction and another channel f1" for the receive direction. In the following text the notation fx (f1,f2,f3,f4,f5,f6,f7) may refer to two frequency channels, fx' and fx", if the duplexing mode is FDD.

The adapter may keep the duplex mode on the power line, using the same or a different duplex separation. The duplex separation is defined as the difference between the frequencies f1' and f1". A condition for simple implementation is keeping the same channel width, but also different channel widths can be implemented.

Figure 3:
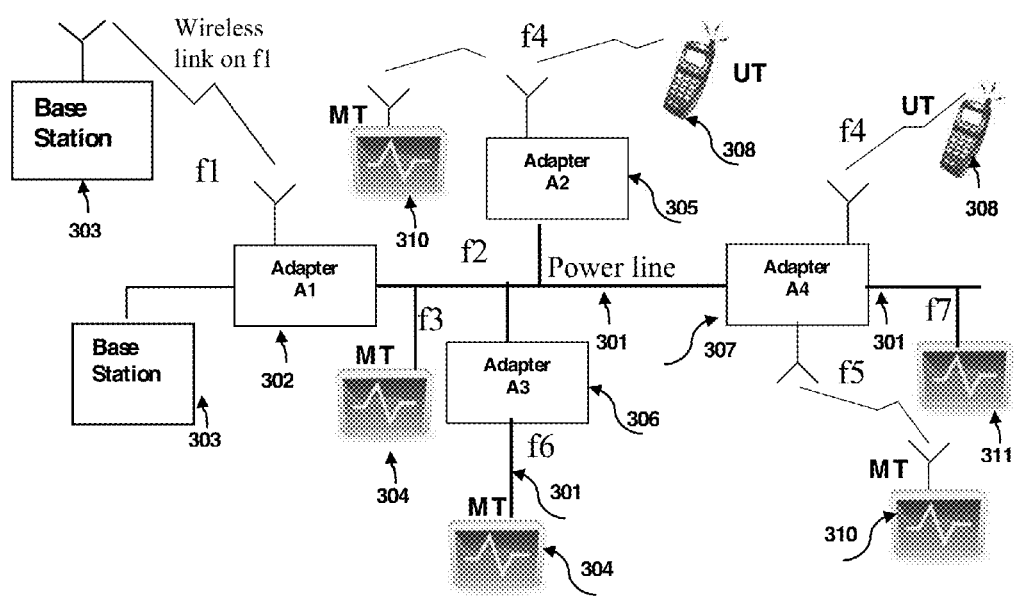
FIG. 3—Represents an example of frequency allocation for the system components

FIG. 3 provides an example of a multi-frequency adapter, where the frequency multiplexing is realized over power line. Different embodiments are presented in continuation, but it should not be understood that these are exhaustive sets of the possible embodiments.

The main wireless base station-303 can communicate with the adapter A1-302 over the frequency f1, while using a wireless technology. Adapter A1-302 acts as a multiplexer over two different frequencies: frequency f2, on which is acts communicating over the power line using wireless technologies, and frequency f3, on which it uses a PLC technology. Note that in this case the Adapter A1-302 additionally includes a PLC head-end for connecting MT-304 and makes the conversion between the PLC technology and the wireless technology.

The adapters A2-305, A3-306, A4-307 may be connected to the adapter A1-302 on the frequency channel f2, using the wireless technology. The MTs-304 directly connected to the adapter A1-302 can use the frequency f3.

The adapters A2-305 and A4-307 may communicate over the air with the UTs-308 and/or MTs-310 over a frequency channel f4, which may be identical with one of the frequency channels f1, f2, f3 or may be a different frequency channel. The adapter A4-307 may include a PAN coordinator (Zigbee) or a PLC head-end.

In some embodiments of this invention also the adapter A3-306 may include a PLC head-end and may communicate with MTs-304 over the power line.

In other embodiments of this invention the adapter A4-307 may communicate with an MT-310 using a new frequency f5, intended for M2M communications over the air or over the power line.

Each frequency channel may have a different width (for example 5 MHz or 10 MHz) and may work in FDD or TDD duplexing.

According to this invention, the PLC technologies may also work on frequencies assigned to wireless communications, as LE TV White Spaces, cellular frequencies at 600, 700, 800 MHz, 2.2 GHz, 2.5 GHz, etc. The allowed power levels and not-wanted radiation levels in these frequency bands are higher than the levels accepted for PLC communications.

There is a full flexibility for the frequency selection; however, in practice some modes may be preferred by different embodiments.

In the example hereinafter we assume that the cellular frequency band of interest is 2.5 GHz. It is possible the following mapping of the cellular operating frequencies, such to make possible the multiplexing of the cellular and M2M traffic over the power line:

f1—FDD paired channels at 2.5 GHz, 5 MHz channel width, 70 MHz duplex separation f2—cognitive radio technologies, including the access to a data-base, can be used for selecting f2 such to avoid interferences and to determine which frequencies may be used over power line at a given location.

f3—frequency for the connection of MT-304 by the adapter A1-302.

f4—2.5 GHz band again, the same channel or an adjacent channel. The actual channel can be provisioned by operator or determined by SON (self-organizing) algorithms.

f5—frequency for the connection of MTs-310 by the adapter A4-307. Lets suppose is used Zigbee wireless technology and the frequency is 2.4 GHz.

f6—frequency for the connection of MTs-309 over power line by the adapter A3-306; lets suppose that this frequency is below 30 MHz.

f7—frequency for the connection of MT-311 by the adapter A4-307.

In power line environment there is a high multi-path due to the reflections on badly terminated different segments, such that a given part of the band may be highly attenuated. The specific aspects for frequency selection for operation over the power line will be discussed hereinafter.

The system may increase the data rate by using a multi-carrier approach, where the carriers may be adjacent or not. The multi-carrier approach may be useful also to avoid the use of some frequency bands, according to regulatory requirements. Carrier aggregation is used in 802.11n, 802.16m, LTE-Advanced and can significantly increase the data rates over the power line.

In conclusion, the frequency band to be used on the power line segment is not necessarily the same with the frequency band traditionally associated to a given technology. The wireless technologies and also the PLC technologies can operate over the power line on any frequency allowed by the radio regulations in a given country.

Deployment

The invention scope is to enforce the wireless radio signal for ubiquitous coverage and to serve as a concentrator for M2M applications. Referring again to FIG. 1, in the indoor deployment, the adapters A2-105, A3-106, A4-107 can provide coverage inside the building, being connected over the AC power lines. For example, the adapter A1-102 may be connected via radio or via a wired connection-104 (Fiber Optics Internet, ADSL, Cable modem, Remote Radio Head) to the cellular operator network. The adapters A2-105 and A4-107 may be plugged into the lamp or AC power sockets. The adapter A3-106 may collect the smart grids communication over the power line.

We note that capacitors between the power line and ground, placed at the entry of the distribution cables into buildings, can act as filters for the higher frequencies transmitted over the power line and improve the frequency reuse factor, as compared with PLC communications which provide Internet or Smart Grid connection to a high number of buildings. Also using higher frequencies for communication over the power line segment can improve the reuse factor.

In outdoor deployments, the adapters A2-105 and A4-107 can provide wireless area coverage. They can be placed on lamp posts (street lights) or electricity distribution poles; the only connection needed is the AC power line. The adapter A3-106 may be used as concentrator of the M2M communications over power line.

In case of the combined indoor and outdoor deployment, the coverage can be extended by using lower frequencies in the neighborhood area of the adapter A1-102.

Connection to the Network and Power Line

Next table presents some examples of possible embodiments for the connectivity of the adapter A1-102:

| Connection to Network | Technology on the power line segment | Functionality on Power Line | Connected Terminals |
|---|---|---|---|
| Wireless | Wireless - Relay type 1, 2, or 3 | Base station | UT, MT |
| Wireless | Wireless Relay with FDD-TDD translation | Base station | UT, MT |
| Wireless | Wireless Relay - TDD-FDD translation | Base station | UT, MT |
| Wireless | PLC technology | Head End Station | MT |
| Wireless | Wireless M2M technology | PAN Coordinator | MT |
| Wired Internet | One or more wireless technologies | Base station | UT, MT |
| Wired Internet | Wireless M2M technology | PAN Coordinator | MT |
| Wired Internet | One or more PLC technologies | Head End Station | MT |

We make the following notes:

If A1-102 is connected to the network as Remote Radio Head, such connection is considered a wired connection to a base station;

A PLC technology can be broadband, narrow-band, etc;

The wired Internet connection can include a connection using the PLC technology;

On the power line, we can have a mix of wireless and PLC technologies, to connect the adapters and the terminals; and PAN Coordinator term is used in IEEE 802.15.4, a narrow-band wireless standard, to designate a station having coordinator role; PAN stands for "Personal Area Network".

The above table is not intended for an exhaustive representation, its scope being to give an idea of the diverse functionality and multi-technologies which may be used in the adapter A1-102 or other adapters.

Adapters—Cost Aspects

The BS connected to A1-102 may be a femto BS or a micro BS, resulting a very cost-effective solution.

The adapters A2-105, A3-106, A4-107 may include a MT. The cost of the MT is low, given the very high quantities for wireless applications.

PHY Technologies

The power line is deployed as a tree, encompassing a high number of reflections. As can be appreciated by those skilled in wireless and PLC communications, the most suitable technology for multi-path handling is OFDM/OFDMA, such that the OFDM-based wireless technologies, as IEEE 802.16, LTE, 802.11-OFDM PHY are most suitable to be used over the power lines.

Power Line Frequency Selection

The power spectral density of power line channels reflects the extremely high multi-path environment which is characteristic for a tree topology with not matched impedances.

Figure 4:
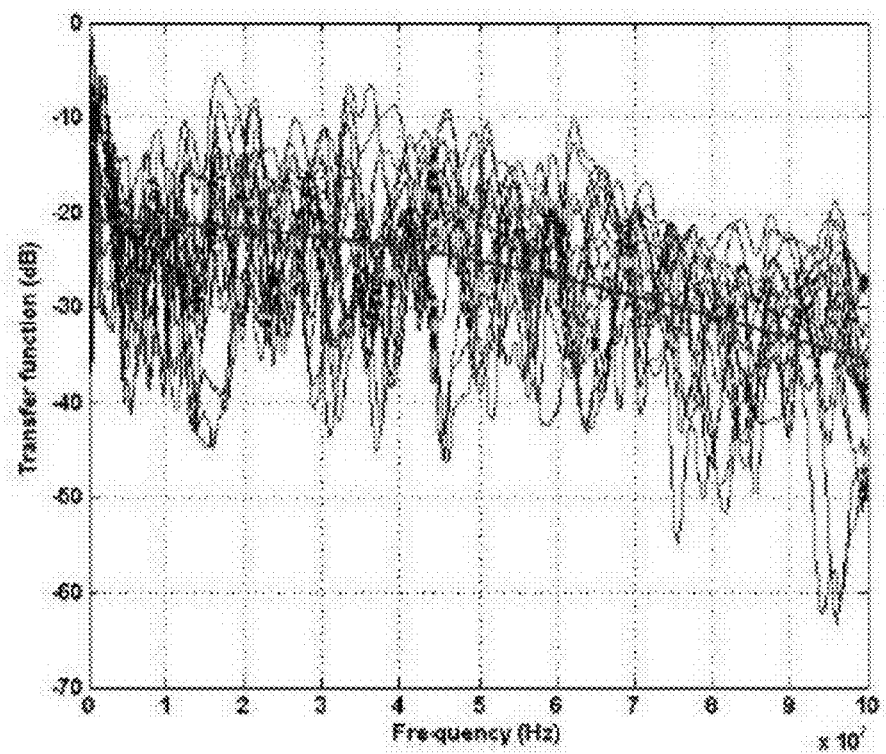
FIG. 4—Represents a variety of PLC channel transfer functions

Deliverable D3.2 of the FP7 ICT project Omega contains experimental results for the power line channel transfer function. The variety of the possible transfer functions below 100 MHz is shown in FIG. 4.

Figure 5:
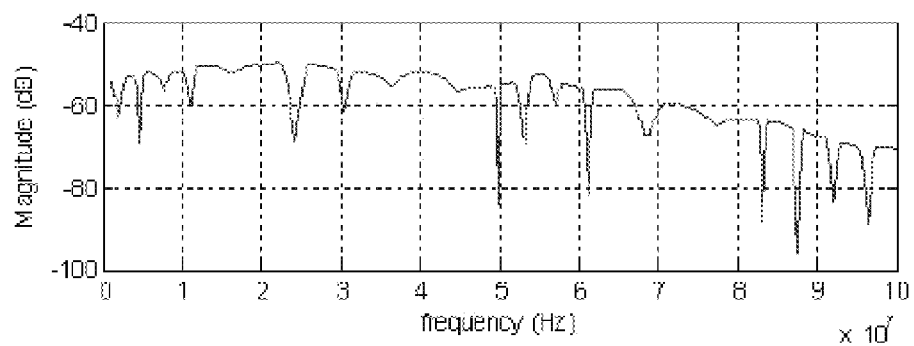
FIG. 5—Represents the dependency of the channel transfer function with frequency at a given location.

A person skilled in the art can appreciate the high dependency of the path attenuation with frequency. For a single location and at a given time moment, the dependency of the channel transfer function with frequency may take the form in FIG. 5.

For a system operating over a low voltage power line, where the multi-path is more pronounced, it is critical to avoid the deep fading (20 dB or more) which can appear at different frequencies. This situation appears also in mobile cellular systems; however the cellular systems do not have much freedom to change the operating frequency, being limited by the amount of the licensed spectrum. The BSs implementing LTE (OFDMA and SC-FDMA technologies) can perform frequency-selective scheduling which can mitigate the multi-path effects.

The most complex and most typical situation is the operation FDD mode; in this case it is needed to find suitable frequency channels separately for the downlink and the uplink operation.

An important role of the System Control Function located within adapter A1-102 is the frequency selection for the operation of the system. In order to perform this selection using a self-organizing approach, it is needed to provide the SCF with measurement results for parameters like the received power levels and eventually their statistics, interference levels on different frequencies over the power line, which are switched under the control of the SCF, achievable modulations and coding. Other parameters of interest may be power spectral density, background noise (interference), lost packets, discarded packets, link capacity. Note that the interference power may be measured in a relative mode as interference to signal ratio (SIR) or signal to interference plus noise ratio (SINR). A wireless terminal, as UT or MT, is in general designed such to report the achievable modulation and coding state, for a target error rate. This report (CQI in LTE) can be used as interference effect indication. Another LTE indicator to assess the impact of the interference level is RSRQ (reference signal received quality).

Based on this information, and taking into account other limitations, as local regulations forbidding the operation on certain frequency channels, SCF may decide the appropriate frequency channels for operation, which provide enough capacity for providing a suitable relaying of the wireless data and eventually using the same modulations and coding over the power line media as used over the wireless media. This last approach is suitable for the implementation of the I-Relay.

Alternatively, the SCF may select the frequency channel from a pre-provisioned list and eventually change the operational frequency channel, based on operational parameters, as those mentioned above.

There may be different embodiments for the measurement of the communication channel attenuation, non-exclusive examples being given below:

1. Measurements to be done within the main wireless technology, by using the measurement and report function provided by a UT included in every adapter. Such functions are included by both LTE and 802.16 technologies; and 2. Measurements to be done by a secondary system operating in parallel with the main wireless technology; the secondary system may use the same wireless technology as the main system or a different one. For example, if the main technology is HSDPA or LTE, a secondary 802.16 system can be used for frequency scanning and measurements. The advantage of the two-system approach is that the communication between ACF and SCF for reporting and frequency control is decoupled from the main wireless system.

In order to implement such approach, the Adapter A1-102 should include a BS based on the secondary technology and each of the Adapters A2-105, A3-106, A4-107 should include a UT based on the secondary technology. With such approach, the main technology may be distributed over the power line using simple Layer 1 relays.

3. Measurements based on special hardware included in the adapters A1-102, A2-105, A3-106, A4-107, and their result being reported to the SCF. A communication protocol shall be implemented between the SCF and ACF located in adapters A2-105, A3-106, A4-107. The advantage of this approach, relative to the secondary technology approach, is the reduced cost of the adapter A1-102, but involves additional modems in each adaptor.

The recommended operation, for a more complicated FDD example, is as follows: SCF in adapter A1-102 selects a frequency f21' for downlink transmission towards the adapters A2-105, A3-106, A4-107. In the same time, the SCF indicates a frequency channel f2" for the up-link communication. The UT inside the adapters associate with the BS, which can be the main BS or the BS included in the adapters, as part of layer 2 or layer 3 relays. The UT or the special hardware mounted inside the adapters will decode the message and the ACF will command the frequency adapter (FA) to send uplink communications on the channel f21".

The system control function (SCF) inside A1-102 or the main BS or inside a network control node will request the UT or the special measurement hardware to report one or more parameter values, as the received power level, its statistics parameters, background noise (interference) levels, interference levels, discarded packets, dropped packets, link capacity, CSI (channel state indicator), RSRQ, etc.

The UT mounted inside the adapters will typically include only a sub-set of a regular User Equipment, such to be still possible to implement the measurement and reporting functions to the serving base station.

The BS or the special measurement hardware included in A1 will also measure on the up-link channel the received level, its statistics and the noise (interference) level.

All the measurement results will be reported to the system control function, which will decide which frequency channel should be selected. The SCF may request a change of f21" to f22". The system operation will resume on the new frequency channel and the BS will make measurements on the new up-link frequency. Additionally, SCF may request a change of f21' to f22'. The system operation will resume from point 2.

The SCF may try to scan more frequencies for finding the best operational solution; however such frequency hopping may disturb the system operation for the other connected adapters. A possible solution is the two-system approach described above or to add a new "sector" inside the BS in the adaptor A1-102. In both cases, the scanning will operate at a different frequency f22. Now, from the start, the adapters A2-105, A3-106, A4-107 have the possibility to chose the best BS, as is done in wireless systems, but without disturbing the main system operation during the scanning process. If the wireless base station and the SU inside the adapters use frequency aggregation, it will be possible to use the same equipment such to operate on one frequency for general communication and on another frequency for measurement purposes. An option is that the scanning will be done by changing the frequency only on the power line segment, while the operation of the measurement SU will be done at substantially lower number of frequencies (typically one). With other words, there will be a frequency conversion between the power line frequencies used in scanning and the frequency used by the measurement SU, such to keep the last one within a small set or fixed.

The frequency scanning may be also done at the A1-102 side of the power line. The adapter A1-102 will be requested by SCF to execute a change of the frequencies used over the power line. Based on the measurement results, it will be chosen the best transmit and receive frequencies over the power line for the adapter community.

When the power line transfer function changes, a new scan may be needed for finding the best operational frequencies. The duration for the measurement of a frequency channel may be as low as a PHY frame or even a PHY sub-frame. The scan and the measurements may be triggered by the adaptors, with a request to SCF. Such a request may take place when there is a degradation of the channel quality. The scanned frequencies shall avoid those frequency channels not allowed for the operation of the PLC systems at a given location. However a better frequency selection can be done if the measurement results are averaged over longer periods of time.

Other possibilities for frequency scanning based on MIMO operation are also indicated in this invention hereinafter. The operation presented above is in fact a self organization based on a cognitive selection of the frequencies to be used over the power line. However, a more simple approach can be used: choosing the operation frequency from a provisioned list.

Adapters and Silent Time-Frequency Resources

In the example above, the adapters A1-102 and A2-105, A3-106, A4-107 may act as frequency translators for the cellular system (Layer 1 Relay). For downlink, their operation is transparent to the transmitted signal.

In up-link, the adapter A1-102, if acting as Layer 1 Relay, may transmit over the entire frequency channel the power line noise in addition to the amplifier noise. To avoid this, it is necessary that the adapters A1-102 will be aware of the up-link scheduling done by the main BS and blank any signals which are not generated by the connected terminals.

Note that this problem does not exist if the adapters behave as Layer 2 or Layer 3 relays, because the base station part of the Relay is doing its local traffic scheduling.

Multi-Frequency Relays

The adapters A1-302, A2-305, A7-307 in FIG. 3 may act as a multi-carrier system, on their BS side. As exemplified hereinbefore, the adapter A1-302 may use the frequencies f2 and f3, while the adapter A4-307 may use the frequencies f4 and f5. In addition, different technologies may be used on each of these frequencies.

MIMO

As is evident to those skilled in the art, MIMO (multiple input multiple output) technologies have a big potential for extending the coverage and improving the spectral efficiency. The wireless systems use different antenna, having minimum correlation, to create a MIMO system. The problem to resolve is how to preserve a MIMO system over a single power line, which may have high correlation between connection points.

Figure 6:
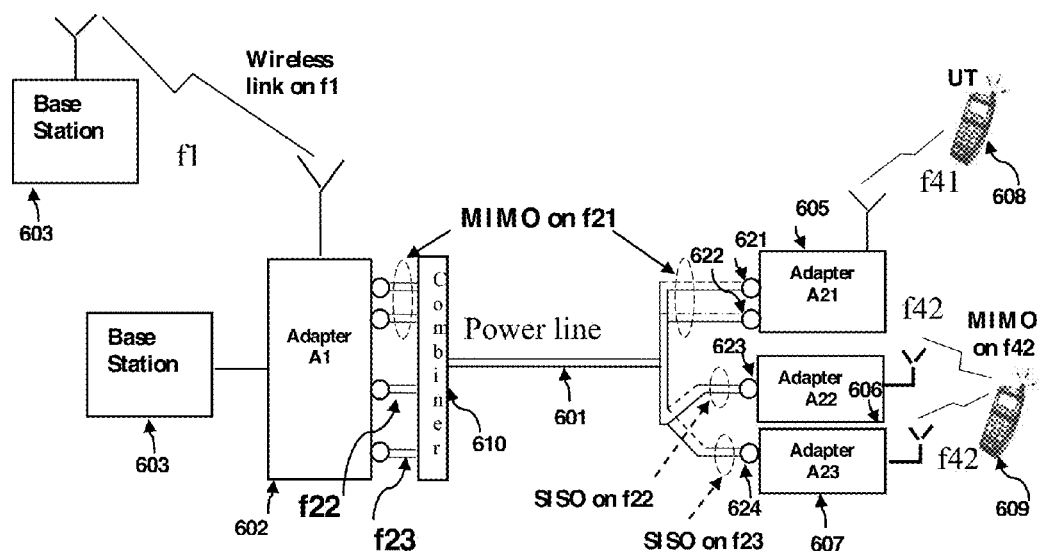
FIG. 6—Represents the transport of the physical signals over different frequency channels for the MIMO operation of the wireless terminals.

In FIG. 6 is shown a non-limiting example of the network configuration of the system. The adapter A1-602 has a number of ports, some forming a MIMO over power line system on the frequency f21, by using two different wire pairs, while the other ports are multiplexed over two frequencies, f22 and f23. The combiner 610 multiplexes all the ports over the power line.

We can assume that inside or outside the adapter A1-602 there is a frequency adaptation, such to map the original two MIMO ports initially operating on the same frequency, to two different frequency channels f22 and f23 to be used over power line by the adapters A22-606 and A23-607. For example, in FIG. 6 the adapter A21-605 has a MIMO connection over the power line, by using two different wire pairs, connected to the ports 621 and 622, and operating on the frequency f21.

The adapters A22-606 and A23-607, on their side connected to the power line, operate as a SISO system. On their other side, these adapters may operate as a MIMO system transmitting on the frequency f42, towards the terminal UT-609.

The signals which would be, in a regular wireless system, transmitted to different antenna ports, are shifted to the frequencies f22 and f23. When the adapters A22-606 and A23-607 translate these signals on the same frequency, f42, they create a spatial MIMO system, to be used by the UT-609 connected wirelessly to these adapters.

We note that an economical implementation may use the adapters A22-606 and A23-607 as Layer 1 relays, providing frequency translation and signal amplification.

The CSI (channel state information) will be provided as in regular MIMO systems, however the wireless channel will be now replaced by a combined power line and wireless channel. The channel matrix will also represent this combination of channels; a similar combination of channels takes place when we combine an outdoor and an indoor wireless channel, in case that the BS is situated outdoors and the UT is situated indoors.

The adapter A1-102 (FIG. 1) can be the center for collaborative MIMO communications, in which a number of adapters A2-105 or A3-106 collaborate for creating path diversity to UTs or MTs.

The MIMO system can be used also for alternative frequency selection. The SCF in adapter A1-102 will command the frequency adaptors to change the frequency used for some MIMO ports. On these frequencies, the UT will report the level and statistics of parameters for example the received signal power, noise (interference), RSRP, RSRQ or CSI, while the main BS will also measure the received levels. Based on this information, the SCF will be able to decide the optimal frequency for operation.

Frequency Reuse Over the Power Line

On the relatively short distances covered by the system, by using relatively low powers and given the attenuation at high frequencies, there is enough spectrum not used at a given location. Cognitive radio procedures can be used for detecting operation of other services, like ADSL, cable modems, other PLC systems, which may operate in the proximity of power lines. In many cases, the frequencies used by ADSL and cable modems should be well known for the deployment in a given area and may be avoided.

The interference with the TV services may be avoided by using the GPS location of the building or of the outdoor area and the interaction with a cognitive data-base.

In relation with the frequency reuse, a best practice will be to use the highest available frequencies for the shortest links.

Control and Management

There is a need for the control and coordination of the operating frequencies over the air and over the power line. There are two aspects here: the coordination between different adapters and the coordination between all the adapters in the system and other base stations.

In case of cellular operation, a connection between this system and another BS will enable the direct communication of the system control function with other BSs, through interfaces as X2 used in LTE. This will allow the collaboration and the implementation of different collaborative procedures. In some embodiments, the UT inside A1-102 (FIG. 1) may carry the information from the BSCF to the main BS.

The adapter A1-102 may act as a local controller and may enforce a given policy in the system. Given the possible communication between the adapter A1-102 and operator's O&M system, our system may be managed by the operator and integrated seamlessly into the full network.

As will be appreciated by those skilled in the art, the terminology used throughout the specification is associated with the LTE and/or 802.16 standards. However, it should be understood that the present invention encompasses other standards such as 802.11, HSDPA or CDMA/EV-DO and the like and both TDD and FDD duplexing modes. Also, the examples provided show certain ways of carrying out the invention. It is to be understood that invention is not intended to be limited to the examples disclosed herein. Rather, the invention extends to all functionally equivalent structures, methods and uses, such as are within the scope of the hereinafter claims.

Power Line Frequency Selection in Context of LTE

As explain before, the interference (named also noise) perceived by a UT/MT (UE in LTE) or a base station (eNB in LTE) is generated over two segments: wireless segment and power line segment. Assuming that the BS is located behind or within the adapter A1-102, the UT/MT included in an I-Relay (FIG. 2) or higher level relays can report interference levels using existing LTE measurements and reports.

As known to those skilled in the art, these reports include RSRP (reference signal received power)/RSRQ (reference signal received quality) and CSI (channel state indication), of which CQI (channel quality indicator) and RI (MIMO range indicator) are the most relevant metrics out of the CSI group.

A preferred embodiment is described hereinafter: The BSCF (system control function), controlling the frequency selection, instructs the ACF (adapter control function) to change the frequency shift inside the Frequency Adapter such to match, on the line interface side, the scanned frequency, and on the measuring UT/MT-206, the operational frequency. UT/MT measures, as instructed by the serving eNB over the Uu interface, one or more of RSRP, RSRQ, CQI and reports the results to the serving eNB. The serving eNB reports back the measurement results to the BSCF. The BSCF takes into account the measurement results as reported by the eNB when selecting a frequency for the power line operation. If the BSCF is located externally to the eNB, the report can be made in the future over the X2 interface, which at this time carries some interference-related information. Another report and management/control possibility is given by the communication with the operation and management system (OAM) of the wireless network.

MIMO—Related Adapter Selection for LTE

For finding the best match for the selection of the MIMO adapters 606-A22 and 607-A23 from the multitude of the available adapters, such to get the optimal MIMO operation, it is possible to use the RI (range indicator) of the CSI report provided by the wireless terminal 609. The range indicator will be influenced by the achievable data rate and by the de-correlation of the spatial multiplexing. For measurement purposes, a practical embodiment should first select the best frequencies for operation over the power line segment and for connecting the MIMO adaptor ports on the wired side (as 623 and 624), using the UT/MT reports, and only after that start the operation in MIMO mode, including diversity modes. The RI can be measured for up-link by the serving eNB. The eNB will report the measurement result to the BSCF. As the BSCF keeps records of the association between the physical adaptor and the allocation of frequencies f22 to port 623 and f23 to port 624, by switching on only those ports contributing to higher CQI or RI the MIMO system is optimized for the locations of the active subscribers.

What is claimed is:

1. A method of extending a coverage of a communication network using a wireless technology over a power lines network, the method comprising:
   providing an adapter coupling a wireless network node with the power lines network and being further operable in at least one of: receiving mode, transmitting mode;
   selecting (i) one or more time-division duplex (TDD) frequency channels or (ii) two or more frequency-division duplex (FDD) frequency channels for communication over the power lines network, responsively to communication performance between the node and one or more other nodes over the power lines network;
   broadcasting over the power lines network, via the adaptor, information indicative of a central frequency point for each one of the selected frequency channel(s);
   establishing a communication link over the power lines network between the node and the one or more other nodes using the selected TDD frequency channel(s) or FDD frequency channels and the adaptor;
   receiving at the adapter from the wireless network node, signals with base-band characteristics in accordance with a wireless technology standard; and
   transferring the received signals onto the established communication link over the power lines network in the selected frequency channel(s), such that the signals on the power lines network preserve the base-band characteristics of the wireless technology standard.

2. The method according to claim 1, where the node is at least one of: a base station, a remote radio head, a relay, an adaptor, and a general wireless terminal.

3. The method according to claim 1, where the wireless technology standard complies with at least one of: a cellular technology, an IEEE 802.11 technology, or an IEEE 802.15 technology.

4. The method according to claim 1, where said frequency channel(s) selection for communications over the power lines network is based on the selection of the frequency channel(s) from a provisioned list.

5. The method according to claim 1, where selecting the channel(s) responsively to the communication performance comprises selecting responsive to a received power level and/or a received power density level and/or an interference level and/or a background noise level and/or achievable modulation and coding state and/or RSRP and/or RSRQ and/or CQI and/or a percentage of discarded packets on the power lines network between the node and the one or more other nodes.

6. The method according to claim 1, wherein the selected frequency channel(s) have a different duplex separation than the received signals.

7. The method according to claim 1, where the received signals comprise MIMO signals in a single frequency channel and wherein transferring the received signals onto the power lines network comprises shifting the MIMO signals onto a plurality of different frequency channels on the power lines network.

8. The method according to claim 1, where transferring the received signals onto the established communication link over the power lines network comprises transmitting to at least two different adapters which form a MIMO system operational to communicate with a general wireless terminal.

9. The method according to claim 1, where at least one frequency channel used over the power lines network is part of licensed or licensed-exempt frequencies allocated to wireless operation.

10. The method of claim 1, wherein selecting the frequency channel(s) comprises selecting in a manner avoiding frequencies used by other services which may be interfered by transmissions on the power lines.

11. The method of claim 1, wherein receiving the signals comprises receiving digital or analog base-band signals or signals from an antenna port, of a cellular network unit.

12. The method of claim 1, wherein transferring the received signals is performed without decoding the signals.

13. The method of claim 1, wherein selecting the frequency channel(s) comprises selecting a frequency channel above 100 MHz.

14. An adapter, comprising:
a power line interface for transmitting and receiving signals over power lines;
a wireless network interface configured to exchange wireless technology signals with a wireless network unit; and
an adapter controller configured to select one or more time-division duplex (TDD) frequency channel(s) or two or more frequency-division duplex (FDD) frequency channels for transmission on the power lines, selected responsively to a communication performance of signals transmitted or received by the adapter on the power lines, to manage broadcasting over the power lines via the power line interface information indicative of a central frequency point for each one of the selected frequency channel(s), to manage establishing a communication link over the power lines using the determined frequency channel(s) and to manage transfer of signals received through the wireless network interface with base-band characteristics in accordance with a wireless technology standard through the power line interface onto the power lines in the selected frequency channel(s), in a manner that the signals on the power lines preserve the base-band characteristics of the wireless technology standard.

15. The adapter of claim 14, wherein the wireless network interface is configured to connect through wires to a cellular network base station, a radio head or a cellular relay and wherein the adapter controller is configured to manage transfer of base station signals from the base station, radio head or cellular relay onto the power lines.

16. The adapter of claim 14, wherein the wireless network interface is configured to connect wirelessly to a cellular network base station and wherein the adapter controller is configured to manage transfer of base station signals from the base station onto the power lines.

17. The adapter of claim 14, wherein the controller is configured to manage transfer of the signals without decoding the signals.

18. The adapter of claim 14, wherein the adapter controller is additionally configured to manage the transmission of signals in accordance with a power line communication (PLC) technology onto the power lines through the power line interface and to convert signals between the PLC technology and the wireless technology standard.

19. The adapter of claim 14, wherein the controller implements a base station which is used to collect measurements of one or more parameters of communication performance on a secondary system separate from that used for transmission of the signals from the wireless network interface.

20. The adapter of claim 14, wherein the frequency channel(s) for transmission on the power lines is selected responsively to a received power level and/or a received power density level and/or an interference level and/or a background noise level and/or achievable modulation and coding state and/or RSRP and/or RSRQ and/or CQI and/or a percentage of discarded packets on the power lines network.

* * * * *